(12) United States Patent
Stucke, Jr. et al.

(10) Patent No.: US 9,141,138 B2
(45) Date of Patent: Sep. 22, 2015

(54) PROTECTIVE CASE FOR PORTABLE ELECTRONIC DEVICE

(71) Applicant: Mattel, Inc., El Segundo, CA (US)

(72) Inventors: Donald W. Stucke, Jr., East Aurora, NY (US); Daniel J. Damon, South Wales, NY (US); Travis William Eckler, Lancaster, NY (US); Anthony Favorito, Buffalo, NY (US); Ross Rumfola, III, Akron, NY (US); Rachel A. Wiatrowski-Pardi, Cheektowaga, NY (US)

(73) Assignee: Mattel, Inc., El Segundo, CA (US)

( * ) Notice: Subject to any disclaimer, the term of this patent is extended or adjusted under 35 U.S.C. 154(b) by 65 days.

(21) Appl. No.: 14/146,974

(22) Filed: Jan. 3, 2014

(65) Prior Publication Data
US 2014/0190974 A1     Jul. 10, 2014

Related U.S. Application Data

(60) Provisional application No. 61/749,002, filed on Jan. 4, 2013.

(51) Int. Cl.
*G06F 1/16*     (2006.01)
*A63F 9/24*     (2006.01)
*A63F 9/00*     (2006.01)

(52) U.S. Cl.
CPC .............. *G06F 1/1626* (2013.01); *A63F 9/24* (2013.01); *A63F 2009/0012* (2013.01); *A63F 2009/241* (2013.01); *A63F 2009/2458* (2013.01); *A63F 2009/2486* (2013.01); *G06F 2200/1633* (2013.01)

(58) Field of Classification Search
CPC combination set(s) only.
See application file for complete search history.

(56) References Cited

U.S. PATENT DOCUMENTS

| 4,373,918 | A | | 2/1983 | Berman | |
|---|---|---|---|---|---|
| 5,586,002 | A | * | 12/1996 | Notarianni | ............... 361/679.26 |
| 5,853,327 | A | | 12/1998 | Gilboa | |
| 6,256,194 | B1 | * | 7/2001 | Choi et al. | ............... 361/679.58 |
| 6,646,864 | B2 | * | 11/2003 | Richardson | ................ 361/679.3 |
| 6,741,461 | B1 | | 5/2004 | Owoeye et al. | |
| 6,758,678 | B2 | | 7/2004 | Van Gilder et al. | |
| 6,761,634 | B1 | | 7/2004 | Peterson et al. | |
| 6,788,531 | B2 | * | 9/2004 | Chen | ......................... 361/679.31 |
| 6,995,976 | B2 | | 2/2006 | Richardson | |
| 7,158,376 | B2 | | 1/2007 | Richardson et al. | |

(Continued)

FOREIGN PATENT DOCUMENTS

JP     3172683 U     12/2011

*Primary Examiner* — Lisa Lea Edmonds
(74) *Attorney, Agent, or Firm* — Edell, Shapiro & Finnan, LLC

(57) ABSTRACT

A protective case for an electronic device includes a cover with a cavity and a back plate that fits within the cavity of the cover. The cover has an aperture that displays either the back plate or an electronic device, if an electronic device is housed in the protective case. The cover may contain at least one locking latch with three orientations, the locking latch includes a tab. In the first orientation, the tab protrudes into the cavity, engages the back plate, holding the back plate within the cavity of the cover. The locking latch may slide across a portion of the cover to the second orientation, where the tab continues to protrude into the cavity and engage the back plate. Once in the second position, the locking latch is free to rotate to the third position, where the tab no longer protrudes into the cavity, allowing the back plate to be removed from the cavity.

20 Claims, 8 Drawing Sheets

(56) References Cited

U.S. PATENT DOCUMENTS

| | | |
|---|---|---|
| 7,180,735 B2 * | 2/2007 | Thomas et al. .......... 361/679.56 |
| 7,230,823 B2 | 6/2007 | Richardson et al. |
| 7,312,984 B2 | 12/2007 | Richardson et al. |
| 7,394,459 B2 | 7/2008 | Bathiche et al. |
| 7,397,464 B1 | 7/2008 | Robbins et al. |
| 7,621,415 B2 | 11/2009 | Han et al. |
| 7,646,613 B2 * | 1/2010 | Ligtenberg et al. ............ 361/801 |
| 7,663,879 B2 | 2/2010 | Richardson et al. |
| 7,902,840 B2 | 3/2011 | Zachut et al. |
| 7,907,128 B2 | 3/2011 | Bathiche et al. |
| 7,907,394 B2 * | 3/2011 | Richardson et al. ........ 361/679.3 |
| 8,107,227 B2 * | 1/2012 | Long et al. ............... 361/679.01 |
| 8,342,325 B2 | 1/2013 | Rayner |
| 2002/0167550 A1 | 11/2002 | Eggen et al. |
| 2002/0195825 A1 * | 12/2002 | Yang .............................. 292/63 |
| 2003/0095374 A1 | 5/2003 | Richardson |
| 2006/0109637 A1 * | 5/2006 | Jiang et al. .................... 361/801 |
| 2006/0277555 A1 | 12/2006 | Howard et al. |
| 2007/0062852 A1 | 3/2007 | Zachut et al. |
| 2008/0029413 A1 | 2/2008 | Brandenburg |
| 2008/0085025 A1 | 4/2008 | Findley |
| 2008/0157574 A1 | 7/2008 | Larussa |
| 2009/0009945 A1 * | 1/2009 | Johnson et al. ............... 361/681 |
| 2009/0050499 A1 | 2/2009 | Calco et al. |
| 2009/0114556 A1 | 5/2009 | Tai et al. |
| 2009/0315258 A1 | 12/2009 | Wallace et al. |
| 2010/0238119 A1 | 9/2010 | Dubrovsky et al. |
| 2011/0001892 A1 | 1/2011 | Gay |
| 2011/0192743 A1 | 8/2011 | May et al. |
| 2011/0227871 A1 | 9/2011 | Cannon |
| 2012/0007808 A1 | 1/2012 | Heatherly et al. |
| 2012/0007817 A1 | 1/2012 | Heatherly et al. |
| 2012/0019480 A1 | 1/2012 | Cannon |
| 2012/0050198 A1 | 3/2012 | Cannon |
| 2012/0062490 A1 | 3/2012 | Heatherly et al. |
| 2014/0194029 A1 * | 7/2014 | Pardi et al. ..................... 446/71 |

\* cited by examiner

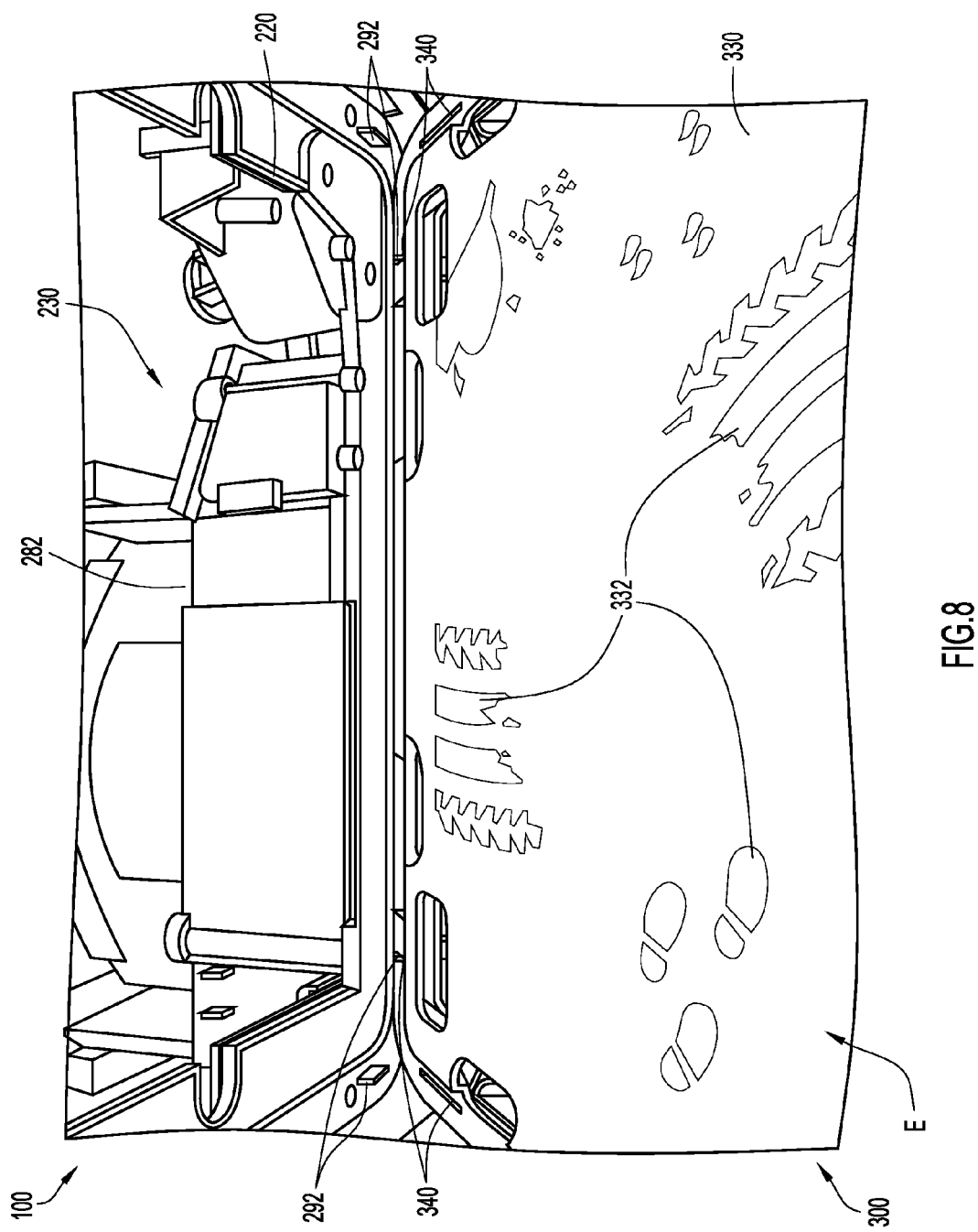

PROTECTIVE CASE FOR PORTABLE ELECTRONIC DEVICE

CROSS-REFERENCE TO RELATED APPLICATION

This application claims priority to and is based on U.S. Patent Application No. 61/749,002, filed Jan. 4, 2013, , entitled "Protective Case for Portable Electronic Device," the entire disclosure of which is incorporated herein by reference in its entirety.

FIELD OF THE INVENTION

The present invention relates to a protective case for a portable electronic device, and in particular, a locking mechanism that retains the case in a closed position.

BACKGROUND OF THE INVENTION

Various protective covers, cases, and sleeves for portable electronic devices, such as cellular phones, smart devices, media players, and portable computers, are known. Some designs provide additional protection to the device from damage, but do not permit use of the device when disposed in the protective cover. Other designs permit use of the device when disposed in the cover, but do not sufficiently protect the device from damage, misuse, or unauthorized use when handled by young children or infants. Furthermore, some designs allow the device to be slipped into a protective cover, while others lock the device within the protective cover. Protective covers, however, often are difficult to open to gain access to the interior of the protective cover and remove the device.

Therefore, there is a need for a protective case for a portable electronic device that is appropriate for use by infants and young children. In addition, there is a need for a protective case for a portable electronic device that is configured to be easily opened and easily locked closed. Furthermore, there is a need for a protective case for a portable electronic device to be configured with an ornamental and interactive design that enhances the play element of the electronic device.

SUMMARY OF THE INVENTION

According to one exemplary embodiment, the present invention includes a protective case for an electronic device with a cover having a top surface, a bottom surface, and a cavity disposed in the bottom surface. Furthermore, the protective case includes a back plate having a depression configured to receive an electronic device, fit within the cavity of the cover. Additionally, at least one latch member is rotatably and slidably disposed in the bottom surface of the cover at a position proximate the cavity. The at least one latch member includes a tab. Moreover, the latch member has a first position and a second position, where when the latch member is in the second position, the tab of the latch member protrudes into the cavity, locking the back plate into the cavity of the cover.

BRIEF DESCRIPTION OF THE DRAWINGS

FIG. 8 illustrates a detailed view of the back plate being inserted in a second orientation into a cover of the protective case of FIG. 1.

Like reference numerals have been used to identify like elements throughout this disclosure.

DETAILED DESCRIPTION OF THE INVENTION

This application incorporates herein by reference, in their entirety, the disclosure of U.S. Non-Provisional Application Ser. No. 13/351,811, entitled "Protective Case for Portable Electronic Device", filed Jan. 17, 2012, and the disclosure of U.S. Provisional Application No. 61/596,759 entitled "Protective Case for Portable Electronic Device", filed Feb. 9, 2012.

Figure 1:
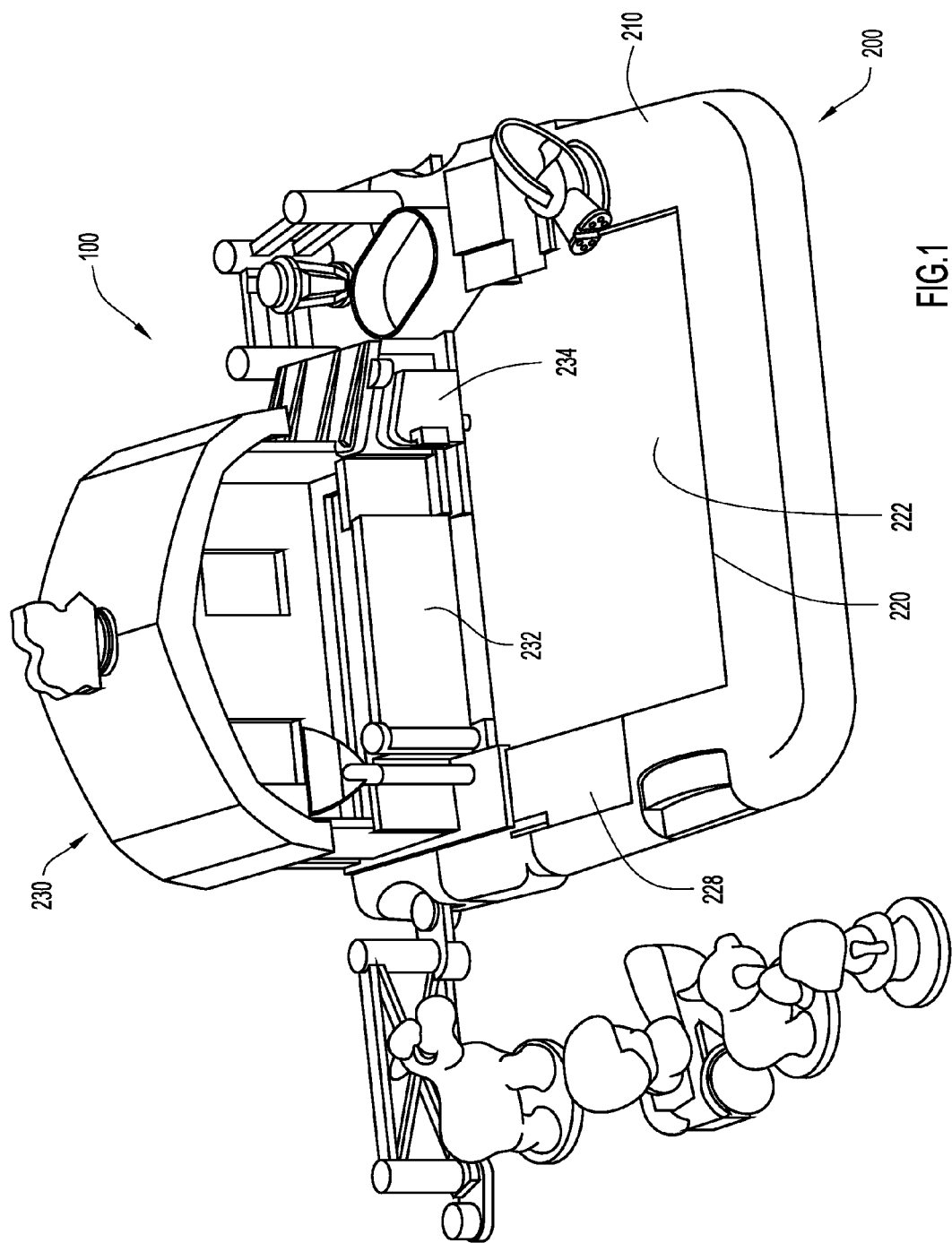
FIG. 1 illustrates a perspective view of a protective case for an electronic device according to an embodiment of the present invention.

Referring to FIG. 1, a perspective view of the protective case 100 is illustrated. The protective case 100 includes a cover 200 with a top surface 210 and a bottom surface 250 (illustrated in FIG. 2). As illustrated, the protective case 100 has an aperture 220 that extends from the top surface 210 of the cover 200 to the bottom surface 250 of the cover 200. The protective case 100 is designed to house and protect a portable electronic device 400 (not shown), while still enabling a user to use the portable electronic device 400. When a portable electronic device 400 is housed within the protective case 100, the screen of the portable electronic device 400 is viewable through the aperture 220 of the cover 200. Furthermore, the cover 200 may contain a protective sheet 222 that extends over the aperture 220. This protective sheet 222 may be a thin transparent planar member through which actuation of the touch screen of the portable electronic device 400 is capable by a user.

Additionally, the top surface 210 of the cover 200 may include an ornamental design 230. As illustrated in FIG. 1, the ornamental design 230 may be disposed on the top surface 210 of the cover 200. In other embodiments, the ornamental design 230 may extend from the top surface 210 of the cover 200. In this embodiment, the ornamental design 230 is configured to resemble a barnyard. The configuration of the ornamental design 230 may be configured to resemble a scene or scenario that matches or interacts with an application that is executed on the portable electronic device 400. For example, the portable electronic device 400 may contain an application that provides games with a barn or farm theme. The ornamental design 230 illustrated in FIG. 1 would match the play element of that application. Furthermore, the ornamental design 230 may include at least one, or a plurality, of moveable members 232, 234. In the illustrated embodiment, the ornamental design 230 includes a first moveable member 232 and a second moveable member 234. In addition, these moveable members 232, 234 may be configured to interact with screen of the electronic device 400 and the application running on the portable electronic device 400. The moveable members 232, 234 may be equipped with conductive portions (not shown) that facilitate conductive recognition with the screen of the electronic device 400. The conductive portions of the moveable members 232, 234 are configured to contact the screen of the electronic device 400, and remain in contact with the screen as the moveable members 232, 234 are repositioned by a user. When the conductive portions of the moveable members 232, 234 are dragged across the screen of the electronic device 400, the screen recognizes each of the conductive portions, resulting in the electronic device 400 producing an animation on the screen and/or outputting a sound. Each conductive portion may be unique in shape and size, allowing the screen to recognize the specific conductive portion that is in contact with the screen. Furthermore, the location of the conductive portion on the screen may also produce a unique and distinct output by the electronic device 400.

Figure 2:
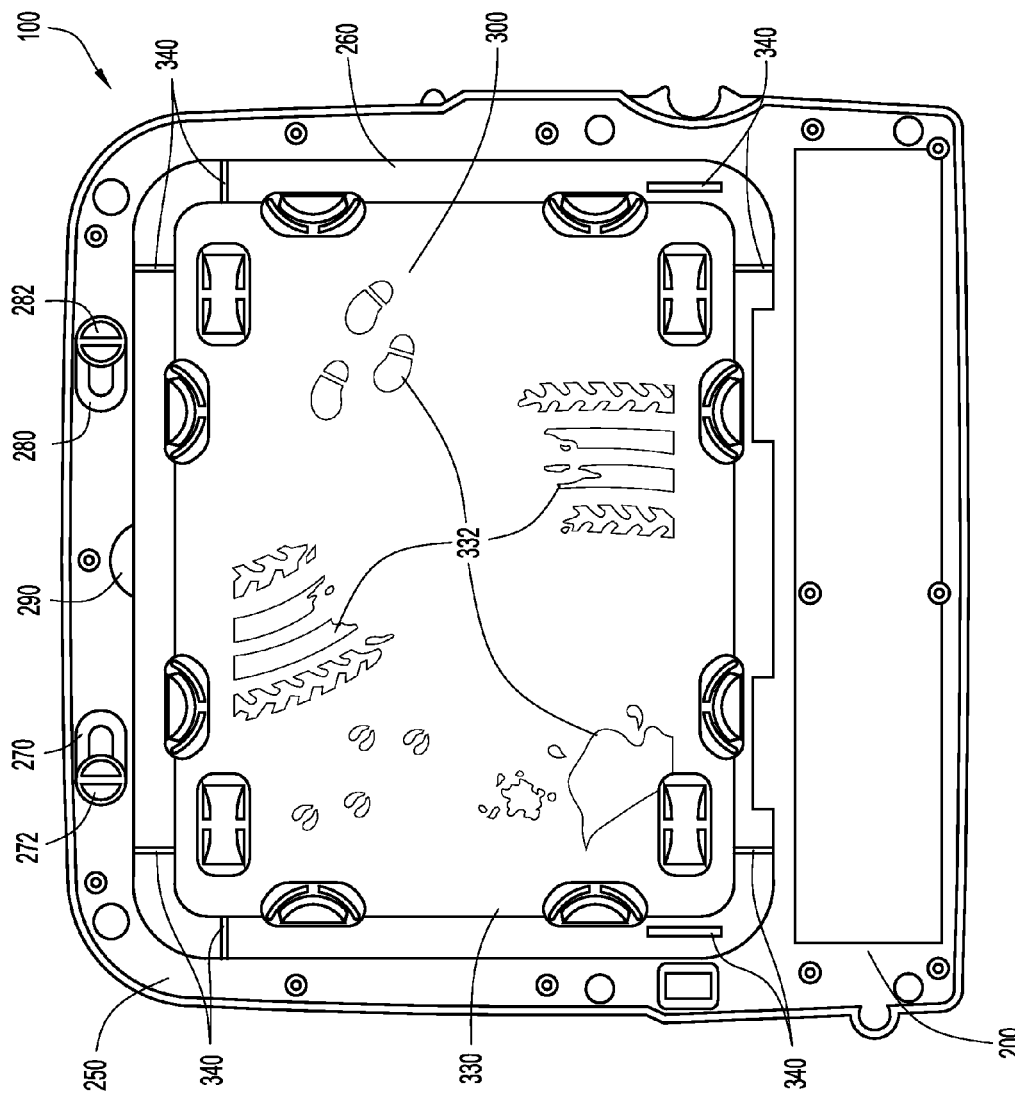
FIG. 2 illustrates a bottom view of the protective case of FIG. 1 with a latching mechanism.

Referring to FIG. 2, illustrated is the bottom surface 250 of the cover 200. The bottom surface 250 of the cover 200 includes a cavity 260. A back plate 300 is configured to rest within the cavity 260 of the bottom surface 250 of the cover 200. The back plate 300 includes a first side 310 (not shown in this Figure) and a second side 330 (illustrated). The first side 310 is configured to receive a portable electronic device 400, while the second side 330 may have ornamental designs 332 that complement the ornamental design 230 of the top surface 210 of the cover 200.

Additionally, the bottom surface 250 of the cover 200 includes a first channel 270 and a second channel 280. The first channel 270 includes a first locking latch 272, which has a first locking tab 274 (not shown in this Figure). The second channel 280 includes a second locking latch 282, which has a second locking tab 284 (not shown in this Figure). Furthermore, the bottom surface 250 of the cover 200 has a finger slot, or finger receiving opening 290. Finger receiving opening 290 is positioned adjacent to the cavity 260, so that finger receiving opening 290 opens into the cavity 260. Finger receiving opening 290 is configured to allow a user to slide a finger into the finger receiving opening 290 to aid in pulling the back plate 300 out from the cavity 260 of the cover 200.

Figure 3:
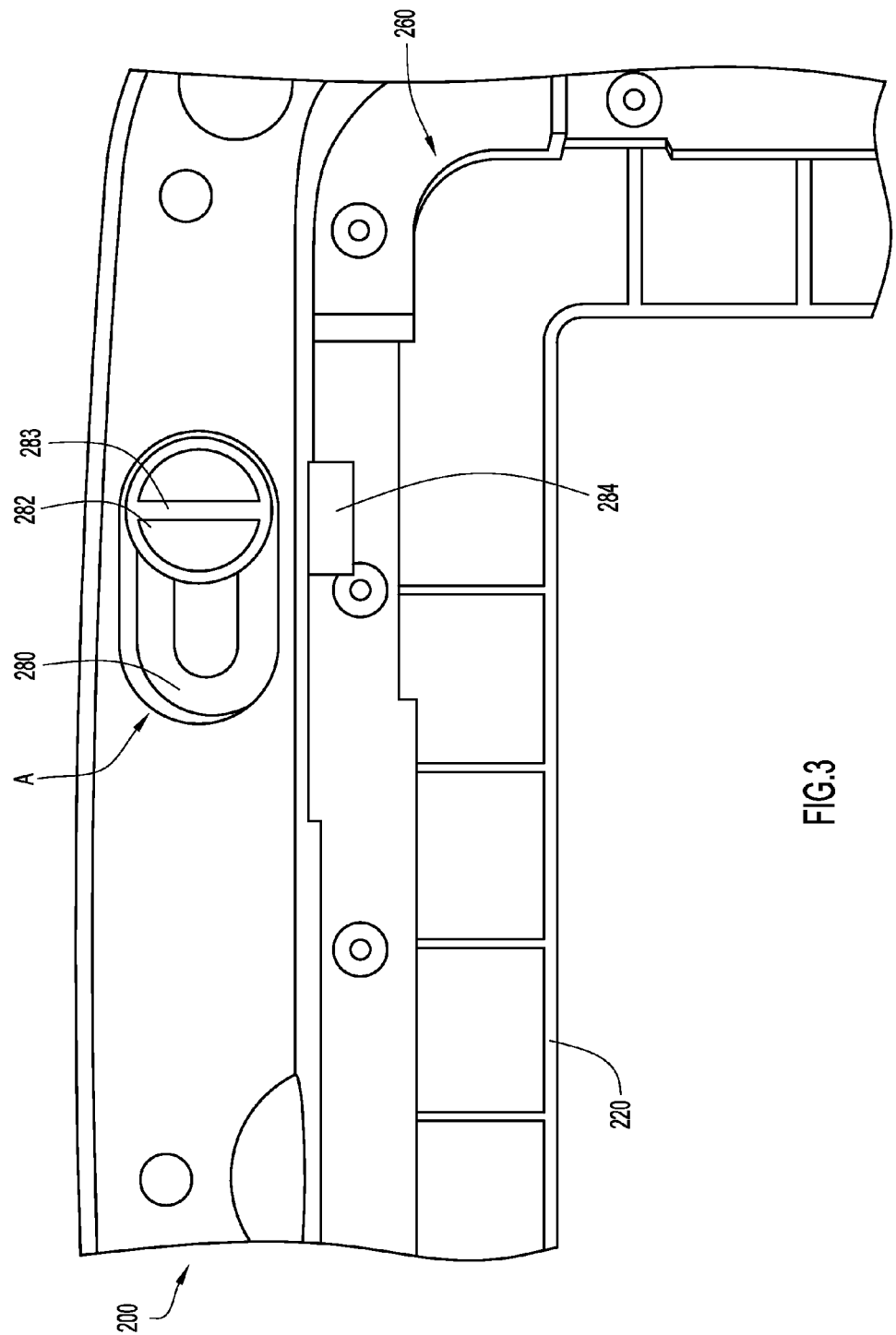
FIG. 3 illustrates a locked position for the latching mechanism of the protective case of FIG. 1.
Figure 4:
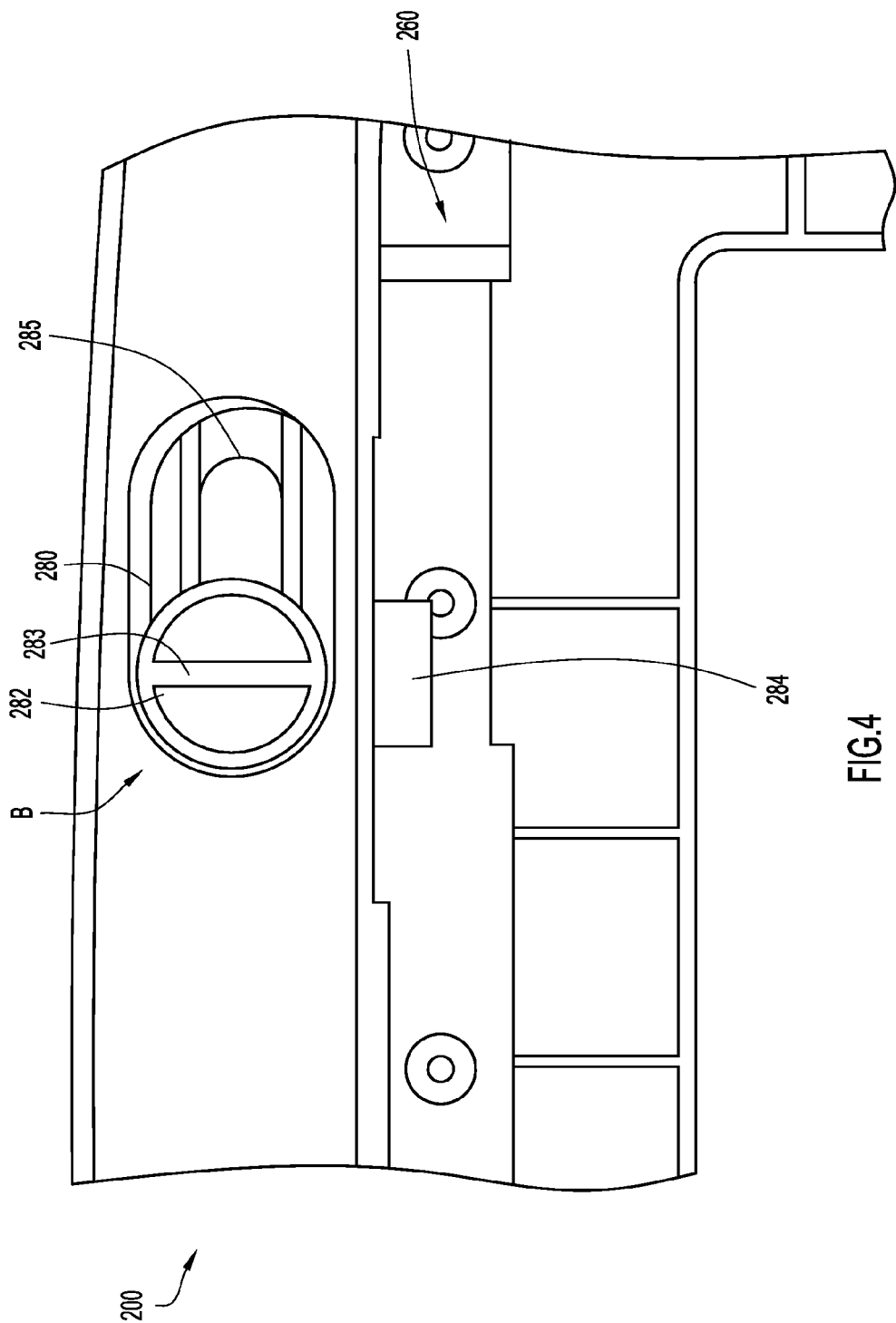
FIG. 4 illustrates an intermediate locked position for the latching mechanism of the protective case of FIG. 1.
Figure 5:
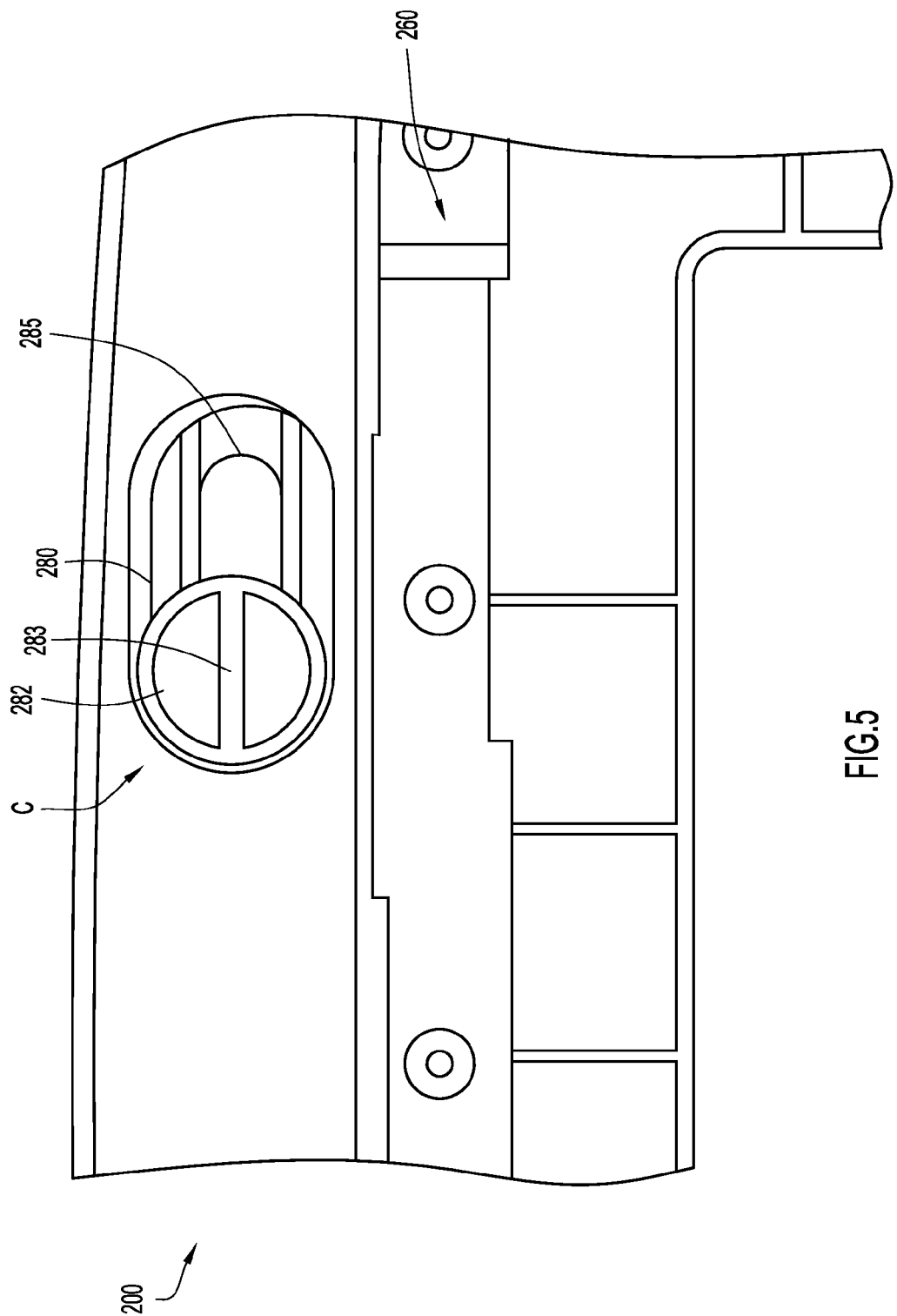
FIG. 5 illustrates an unlocked position for the latching mechanism of the protective case of FIG. 1.

Referring to FIGS. 3, 4, and 5, illustrated is the locking operation of the second locking latch 282. While FIGS. 3, 4, and 5 illustrate the operation of the second locking latch 282, it is understood that the first locking latch 272 operates in a similar or identical manner. FIG. 3 illustrates the second locking latch 282 in the locked position A. In the locked position A, the second locking latch 282 is located to the right side of the second channel 280 with the second center projection 283 in a vertical orientation. Conversely, not shown is the first locking latch 272 located to the left side of the first channel 270, also with the first center projection in a vertical orientation. Because the first and second channels 270, 280 are positioned on the bottom surface 250 of the cover 200 proximate to the cavity 260, the first locking tab 274 (not shown) and the second locking tab 284 protrude into the cavity 260 when the first and second locking latches 272, 282 are in the locked position A.

In order to unlock the locking latches 272, 282, the locking latches 272, 282 must first be moved to their intermediate locked position B. FIG. 4 illustrates the second locking latch 282 in the intermediate locked position B, where the second locking latch 282 has been slid along the second channel 280 from the right side to the left side. Conversely, when the first locking latch 272 is in the intermediate locked position B, the first locking latch 272 has been slid from the left side of the first channel 270 to the right side of the first channel 270. Furthermore, as illustrated in FIG. 4, the second center projection 283 is still in a vertical orientation and the tab 284 is still protruding into the cavity 260. Similarly, when the first locking latch 272 is slid across the first channel 270 to the intermediate locked position B, the first center projection remains in a vertical orientation and the first locking tab 274 continues to protrude into the cavity 260.

The last step to unlock the locking latches 272, 282 requires the locking latches 272, 282 to be rotated to their unlocked position C. As illustrated in FIG. 5, the second locking latch 282, still positioned to the left of the second channel 280, has been rotated 90 degrees so the second central projection 283 is in a horizontal orientation. Similarly, the first locking latch 272 (not shown), when positioned to the right of the first channel 270, can be rotated 90 degrees so the first central projection is in a horizontal orientation. With the rotation of the locking latches 272, 282 from the intermediate locked position B to the unlocked position C, the first and second locking tabs 274, 284 no longer protrude into the cavity 260. Therefore, the locking tabs 274, 284 can no longer engage the back plate 300 and retain it within the cavity 260.

In addition, the locking latches 272, 282 may only rotate when slid across the channel 270, 280 from the locked position A to the intermediate locked position B. The locking latches 272, 282 may only rotate when in the intermediate position B in the channels 270, 280. As illustrated in FIGS. 4 and 5, the first and second channels 270, 280 include a guard 275 (not shown), 285 which prevent the locking latches 272, 282 from rotating when the locking latches 272, 282 are in the locked position A. In the second channel 280, the guard 285 is positioned on the right side of the channel 280. Conversely, in the first channel 270 (not shown), the guard 275 (not shown) is positioned on the left side of the channel 270. The guards 275, 285 engage the underside of the locking latches 272, 282 to prevent the locking latches 272, 282 from rotating past the guards.

Figure 6:
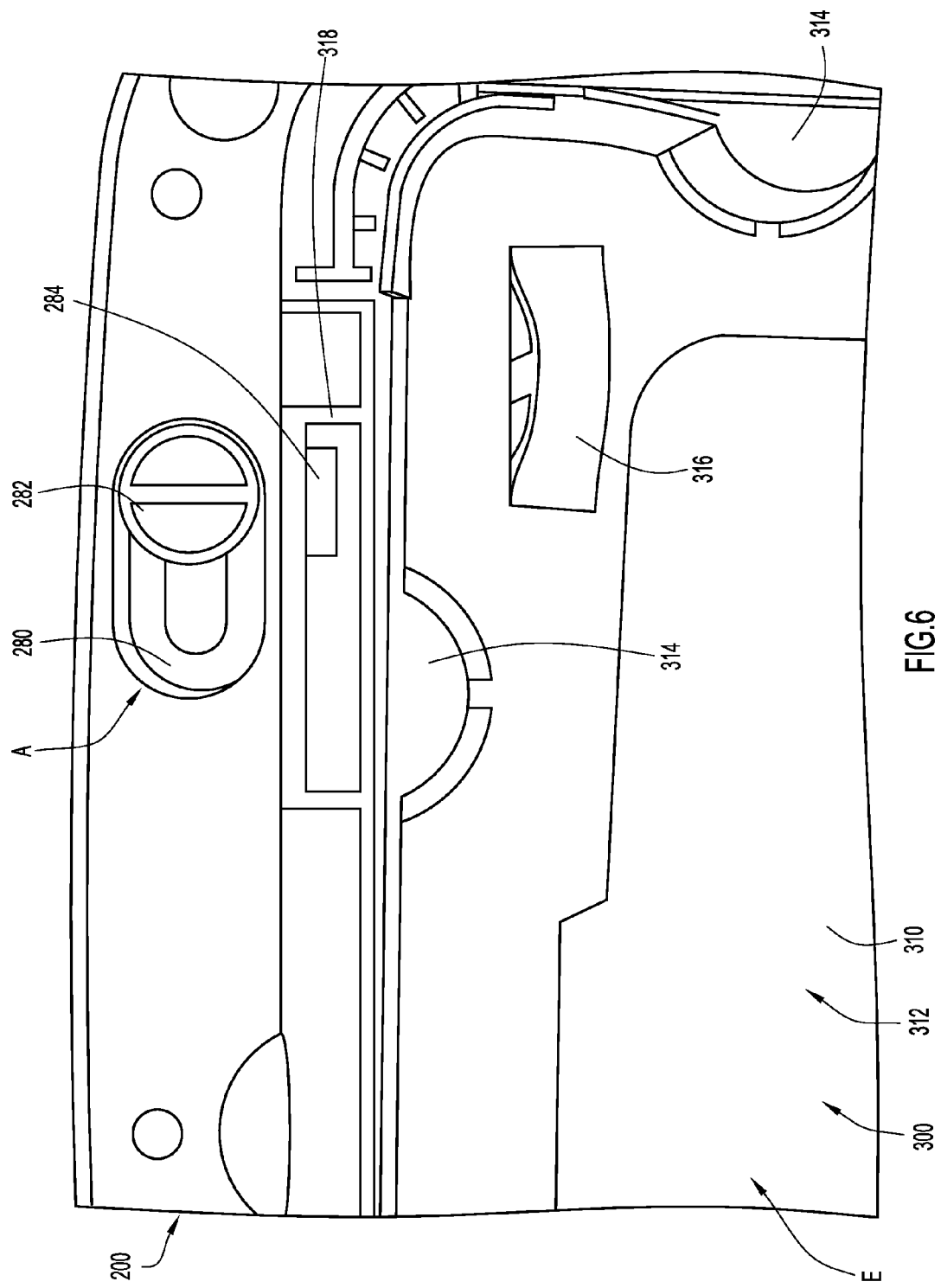
FIG. 6 illustrates the interaction of the latching mechanism with a back plate of the protective case of FIG. 1.
Figure 7:
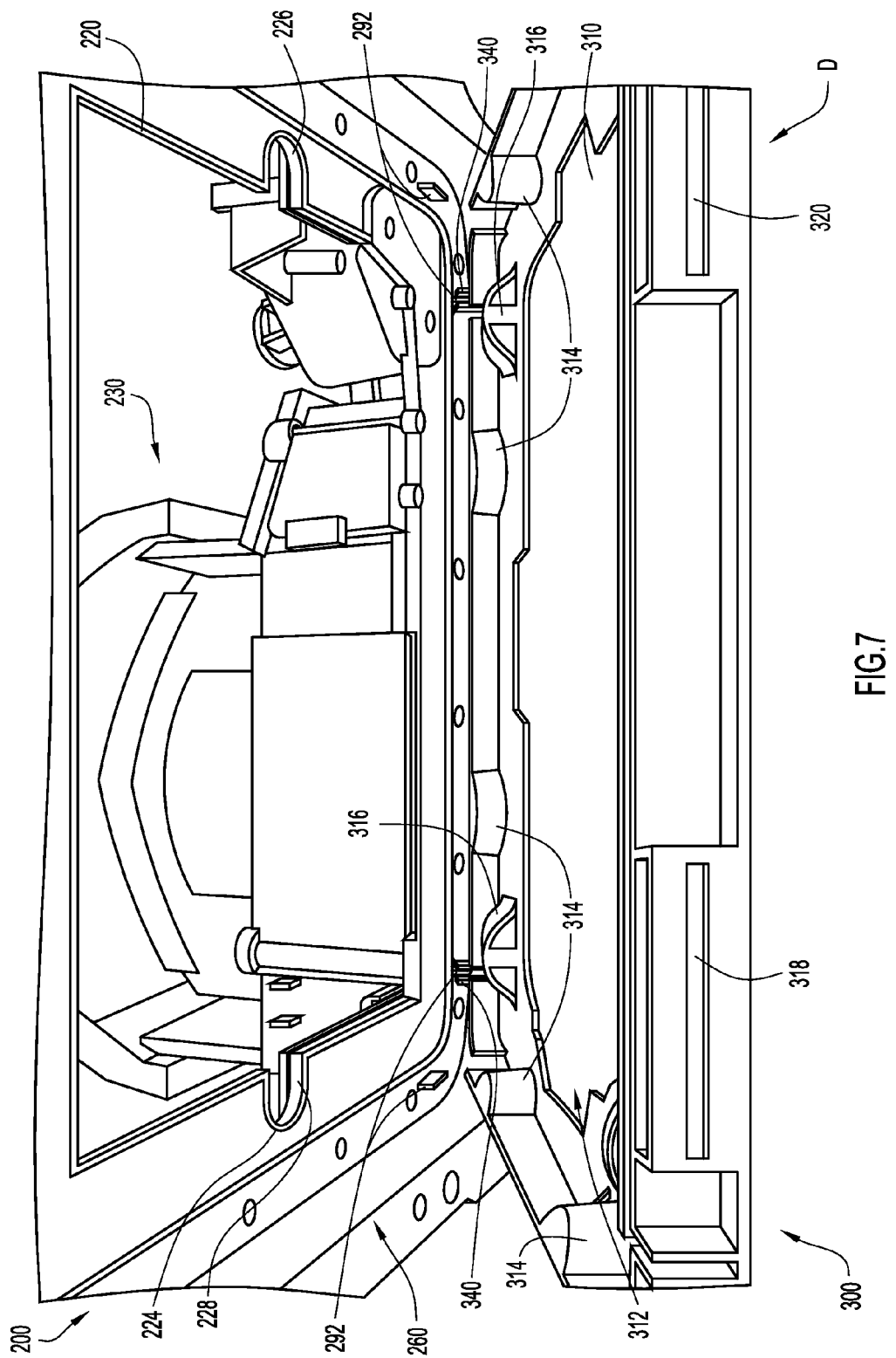
FIG. 7 illustrates a detailed view of the back plate being inserted in a first orientation into a cover of the protective case of FIG. 1.

Referring to FIGS. 6 and 7, illustrated is the first side 310 of the back plate 300. The first side 310 of the back plate 300 includes a depression 312 that is configured to receive a portable electronic device 400. The depression 312 may contain a plurality of sidewall resilient members 314 and a plurality of base resilient members 316. The resilient members 314, 316 serve to cushion and maintain the position of the portable electronic device 400 within the cavity 260 of the cover 200 when back plate 300 is attached to cover 200. The resilient members 314, 316 are positioned along the depression 312 to cushion and maintain the position of the portable electronic device 400 along both the horizontal axis and the vertical axis. The resilient members 314, 316 may be formed or molded from a thermoplastic elastomer (TPE) material or any other suitable resilient material.

FIG. 7 illustrates the back plate 300 being placed in the cavity 260 of the cover 200 in a first orientation D, where the depression 312 faces the aperture 220 on the cover 200. FIG. 8 illustrates the back plate 300 being placed in the cavity 260 of the cover 200 in a second orientation E, where the second side 330 of the back plate 300 faces the aperture 220 on the cover 200. Referring to FIG. 7, the back plate 300 being inserted into the cavity 260 in the first orientation D is best used when the back plate 300 is housing a portable electronic device 400. This enables the screen 410 of the portable electronic device 400 to be placed adjacent to the aperture 220 and the protective sheet 222 for use of the portable electronic device 400 within the protective case 100. Moreover, as best illustrated in FIG. 2, when the back plate 300 is placed within the cavity 260 in the first orientation D, the second side 330 is substantially flush with the bottom surface 250 of the cover 200. Furthermore, as illustrated in FIGS. 2, 7, and 8, the back plate 300 includes a series of alignment crevices 340 along the boarder of the back plate 300. These alignment crevices 340 extend from the first side 310 through the back plate 300 to the second side 330 of the back plate 300. As illustrated in FIGS. 7 and 8, the alignment crevices 340 align with the alignment tabs 292 disposed within the cavity 260 of the bottom surface 250 of the cover 200. When the back plate 300 is positioned within the cavity 260 of the bottom surface 250 of the cover 200, the alignment crevices 340 receive the alignment tabs 292, aligning the back plate 300 into the proper position within the cavity 260. The alignment tabs 292 are received by the alignment crevices 340 when the back plate 300 is placed within the cavity 260 in both the first orientation D and second orientation E.

Continuing with FIG. 7, illustrated is the aperture 220 with a first slot 224 and a second slot 226. The first slot 224 is located on one side of the aperture 220, while the second slot 226 is located on an opposite side of the aperture 220 from the first slot 224. The first slot 224 is configured to align with the "Home" button on a portable electronic device 400. Moreover, the second slot 226 is configured to align with a light sensor and/or speaker of a portable electronic device 400. Moreover, the top surface 210 of the cover 200 may have a sliding guard 228 with a first and second position. In the first position, illustrated in FIG. 7, the sliding guard 228 is not covering the first slot 224. The first position is configured to give a user access to the "Home" button of the portable electronic device 400 when the portable electronic device 400 is in the case 100. Conversely, when the sliding guard 228 is slid into the second position, as illustrated in FIG. 1, the sliding guard 228 is positioned over the first slot 224. The second position of the sliding guard 228 prevents a user from pushing the "Home" button of a portable electronic device 400 in the protective case 100. The second position prevents a user from accidentally pressing the "Home" button of the portable electronic device 400, such as when an infant is playing with an Apple® iPad® placed in the protective case 100.

Referring to FIG. 8, as stated previously, illustrated is the back plate 300 being placed in the cavity 260 of the cover 200 in the second orientation E. In the second orientation E, the second side 330 of the back plate 300 faces the aperture 220 on the cover 200, and is adjacent to the protective sheet 222. The second orientation E is ideal for when a user would like to use the protective case 100 and interact with the ornamental design 230 disposed on the top surface 210 of the cover 200 but the user does not have a portable electronic device 400 to be housed in the protective case 100. The second orientation E of the back plate 300 in the cavity 260 allows for the second side 330 of the back plate 300 to provide support to the protective sheet 222, preventing damage to the protective sheet 222 in this second mode of use. Furthermore, as previously discussed, the second side 330 of the back plate 300 contains ornamental designs 332 that compliment, or are of the same theme or style as, the ornamental design 230 disposed on the top surface 210 of the cover 200. The second orientation E of the back plate 300 in the cavity 260 provides additional use for the features of the protective case 100 when the protective case 100 is not housing a portable electronic device 400.

Referring back to FIG. 6, illustrated is the back plate 300 placed into the cavity 260 of the cover 200 in the second orientation E. The back plate 300 includes a first receptacle 318 and a second receptacle 320 (illustrated in FIG. 7). When the back plate 300 is placed in the cavity 260 in the first orientation D, the first receptacle 318 is located proximate to the first channel 270, and the second receptacle 320 is located proximate to the second channel 280. Conversely, when the back plate 300 is placed in the cavity 260 in the second orientation E, the first receptacle 318 is located proximate to the second channel 280, and the second receptacle 320 is located proximate to the first channel 270. The first receptacle 318 is configured to interact and receive the first locking tab 274 when the back plate 300 is placed in the first orientation D. Similarly, the second receptacle 320 is configured to interact and receive the second locking tab 284 when the back plate 300 is placed in the first orientation D. However, when the back plate 300 is placed within the cavity 260 in the second orientation E, the first receptacle 318 is configured to interact and receive the second locking tab 284. Additionally, the second receptacle 320 is configured to interact and receive the first locking tab 274 when the back plate 300 is placed within the cavity 260 in the second orientation E. The locking tabs 274, 284 are configured to protrude into the cavity 260 and into the receptacles 318, 320, locking the back plate 300 into the cavity 260 of the cover 200 when the locking latches 272, 282 are in the locked position A and the intermediate locked position B.

It is to be understood that a protective case for a portable electronic device may be fabricated from any suitable material, or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

It is also to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A protective case for a portable electronic device, comprising:
    a cover comprising
        a top surface,
        a bottom surface, and
        a cavity disposed in the bottom surface;
    a back plate having a depression configured to receive an electronic device, the back plate being configured to fit within the cavity of the cover; and
    at least one latch member rotatably and slidably disposed in the bottom surface of the cover proximate the cavity, the at least one latch member including a tab, wherein the latch member has a first position and a second position, the second position causing the tab of the latch member to protrude into the cavity, locking the back plate into the cavity of the cover.

2. The protective case of claim 1, wherein the cover further comprises an aperture disposed on the top surface of the cover, the portable electronic device being viewable through the aperture when the electronic device is positioned within the cavity.

3. The protective case of claim 2, further comprising a protective sheet that extends across the aperture on the top surface of the cover.

4. The protective case of claim 3, further comprising an ornamental design disposed on the top surface and around the aperture of the cover, the ornamental design including at least one moveable member configured to interact with the portable electronic device.

5. The protective case of claim 1, wherein the back plate further comprises at least one receptacle that is engagable by the tab of the at least one latch member when the at least one latch member is in the second position.

6. The protective case of claim 1, wherein the depression of the back plate includes a plurality of resilient members.

7. A protective case for a portable electronic device, comprising:
    a cover comprising
        a top surface,
        a bottom surface, and
        a cavity disposed in the bottom surface;
    a back plate having a first side and a second side, the second side including a depression configured to receive a portable electronic device, the back plate being configured to fit within the cavity of the cover in a first position, where the second side is placed within the cavity and encloses the portable electronic device between the cover and the back plate, and a second position, where the first side is placed within the cavity; and
    at least one latch member rotatably and slidably disposed on the cover, the at least one latch member including a tab, wherein the latch member has a first position and a second position, the second position causing the tab of the latch member to protrude into the cavity, locking the back plate into the cavity of the cover.

8. The protective case of claim 7, wherein the cover further comprises an aperture disposed on the top surface of the cover.

9. The protective case of claim 8, further comprising a protective sheet that extends across the aperture on the top surface of the cover.

10. The protective case of claim 8, wherein when the back plate is placed in the cavity in the first position, the portable electronic device is viewable through the aperture when the portable electronic device is positioned within the depression of the back plate.

11. The protective case of claim 8, wherein when the back plate is placed in the cavity in the second position, the first side of the back plate is viewable through the aperture.

12. The protective case of claim 11, wherein the first side of the back plate includes ornamental designs.

13. The protective case of claim 7, further comprising an ornamental design disposed on the top surface and around the aperture of the cover, the ornamental design including at least one moveable member configured to interact with the portable electronic device or the first side of the back plate.

14. The protective case of claim 7, wherein the at least one latch member is disposed in the bottom surface of the cover proximate the cavity.

15. The protective case of claim 14, wherein the back plate further comprises at least one receptacle disposed between the first side and the second side, the at least one receptacle is engagable by the tab of the at least one latch member when the at least one latch member is in the second position.

16. A protective case for a portable electronic device, comprising:
    a cover comprising
        a top surface,
        a bottom surface, and
        a cavity disposed in the bottom surface;
    a back plate having a depression configured to receive the portable electronic device and at least one receptacle, the back plate being configured to fit within the cavity of the cover; and
    at least one latch member rotatably and slidably disposed on the cover, the at least one latch member including a tab, wherein the latch member has an unlocked position and a locked position, the locked position enabling the tab of the latch member to protrude into the cavity engaging the at least one receptacle of the back plate and locking the back plate into the cavity of the cover.

17. The protective case of claim 16, wherein the at least one latch member includes an intermediate position, the at least one latch member being placed in the intermediate position when being repositioned from the unlocked position to the locked position and when being repositioned from the locked position to the unlocked position.

18. The protective case of claim 17, wherein the at least one latch member is configured to rotate from the unlocked position to the intermediate position, the tab being rotated to protrude into the cavity when the at least one latch member is rotated.

19. The protective case of claim 18, wherein the at least one latch member is configured to slide from the intermediate position to the locked position, where the at least one latch member is prevented from rotation when the at least one latch member is in the locked position.

20. The protective case of claim 16, wherein the cover further comprises an aperture disposed on the top surface of the cover, the portable electronic device being viewable through the aperture when the portable electronic device is positioned within the cavity.

* * * * *